(12) United States Patent
Cummings

(10) Patent No.: US 11,414,915 B1
(45) Date of Patent: Aug. 16, 2022

(54) BREACH TRAINING DOOR ASSEMBLY WITH SCREEN DOOR

(71) Applicant: Josh Cummings, Escalon, CA (US)

(72) Inventor: Josh Cummings, Escalon, CA (US)

(*) Notice: Subject to any disclaimer, the term of this patent is extended or adjusted under 35 U.S.C. 154(b) by 267 days.

(21) Appl. No.: 16/872,211

(22) Filed: May 11, 2020

Related U.S. Application Data

(63) Continuation-in-part of application No. 16/285,108, filed on Feb. 25, 2019.

(60) Provisional application No. 62/636,102, filed on Feb. 27, 2018.

(51) Int. Cl.
| | |
|---|---|
| *G09B 19/24* | (2006.01) |
| *E06B 1/52* | (2006.01) |
| *E06B 3/70* | (2006.01) |
| *G09B 9/00* | (2006.01) |
| *E06B 9/52* | (2006.01) |
| *A62C 99/00* | (2010.01) |

(52) U.S. Cl.
CPC .............. *E06B 1/52* (2013.01); *E06B 3/7001* (2013.01); *G09B 19/24* (2013.01); *A62C 99/0081* (2013.01); *E05Y 2900/132* (2013.01); *E06B 2009/527* (2013.01); *G09B 9/003* (2013.01)

(58) Field of Classification Search
CPC ........ G09B 9/003; G09B 19/00; G09B 19/24; A62C 99/0081
See application file for complete search history.

(56) References Cited

U.S. PATENT DOCUMENTS

| | | | | |
|---|---|---|---|---|
| 5,906,493 | A * | 5/1999 | Bishop | G09B 9/00 292/357 |
| 6,877,988 | B2 * | 4/2005 | Phillips | G09B 19/00 434/226 |
| 7,789,666 | B2 * | 9/2010 | Sovine | G09B 9/003 434/226 |
| 7,967,326 | B2 * | 6/2011 | Klementowicz, III | G09B 19/00 434/226 |
| 7,972,139 | B2 * | 7/2011 | Staub | G09B 19/24 434/226 |
| 8,128,408 | B2 * | 3/2012 | Phillips | G09B 9/00 434/226 |
| 8,197,257 | B2 * | 6/2012 | Clewis | A62B 5/00 434/226 |
| 8,408,917 | B2 * | 4/2013 | Perrone | G09B 19/24 434/226 |
| 8,439,685 | B2 * | 5/2013 | Shelley | A62C 99/0081 434/226 |
| 8,485,825 | B2 * | 7/2013 | Walker | G09B 19/00 434/226 |
| 9,181,735 | B2 * | 11/2015 | Troxell | E05B 17/0062 |
| 9,318,028 | B1 * | 4/2016 | Ingesson | G09B 9/003 |
| 9,550,082 | B2 * | 1/2017 | Britton | G09B 19/24 |
| 10,688,328 | B2 * | 6/2020 | Pristach | E06B 3/12 |

(Continued)

*Primary Examiner* — Kurt Fernstrom
(74) *Attorney, Agent, or Firm* — Thomas M. Freiburger

(57) ABSTRACT

A breach training door apparatus includes a heavy outer frame supporting a door on hinges, preferably lift-out hinges. The door includes a crush prop to receive a section of a door of metal, wood or other material, and is versatile in allowing breach training by battering rams, breach tools or explosives. Accessories can be attached to the frame to facilitate several different training operations. A screen door can be attached to the frame when desired for training.

12 Claims, 12 Drawing Sheets

(56) References Cited

U.S. PATENT DOCUMENTS

| | | | |
|---|---|---|---|
| 2005/0050816 A1* | 3/2005 | Manning | G09B 19/00 |
| | | | 52/213 |
| 2008/0014564 A1* | 1/2008 | Allen | G09B 19/00 |
| | | | 434/226 |
| 2010/0304344 A1* | 12/2010 | Walker | G09B 19/00 |
| | | | 434/226 |
| 2012/0244512 A1* | 9/2012 | Norris | G09B 19/003 |
| | | | 434/387 |

* cited by examiner

BREACH TRAINING DOOR ASSEMBLY WITH SCREEN DOOR

This application is a continuation-in-part of application Ser. No. 16/285,108, filed Feb. 25, 2019, which claimed benefit of provisional application Ser. No. 62/636,102, filed Feb. 27, 2018.

BACKGROUND OF THE INVENTION

This invention is concerned with tools and structures for training police, fire, military and emergency personnel in the use of breaching tools to breach a door quickly and efficiently. More specifically the invention concerns a breach training door with an integrated crush prop that receives a door section insert and can be reused many times.

In emergency situations or military operations, breaching tools can be used to quickly force open doors and windows. Special tools for this purpose include heavy steel tools, similar to crowbars, with working ends of particular configuration for particular breaching tasks. The use of these tools, and techniques and procedures for breaching a door, require training. Breach training doors have been used for this purpose and have been effective structures for training.

Some of the prior breach training doors and structures for imitating a door have been patented. See, for example, U.S. Pat. Nos. 3,808,759, 5,080,354, 6,877,988, 8,408,917, 8,419,435, 8,926,332 and 9,318,028 and Pubs. Nos. 2010/0304344, 2011/0223569 and 2012/0244512. These have been reuseable to different degrees.

U.S. Pat. No. 8,419,435 describes a breach training structure which is not a true door hung on hinges, but simply a frame within which can be placed a rectangular section of a metal door, thus providing a training prop to provide for simulation of certain forceable entry techniques on metal doors. The training structure is essentially a base plate with an upright frame configured to receive a door section or a simulation of a door section. Horizontal bands extend through the width of the frame, on the inside and the outside, to retain the door section in place. In a simulated breaching operation the metal door section may be destroyed, but the frame is intended to remain intact.

Breach training apparatus of the prior art have not provided a breach training door in which a door frame, hung on hinges within an outer frame simulating building structures, is configured to receive wood or metal door sections of various sizes, such that these door sections can be sacrificed during training and replaced, with the hung door frame also serving to train the use of breaching tools between the door and the jamb.

SUMMARY OF THE INVENTION

The present invention encompasses a breach training door including a heavy metal base plate for resting on a floor or ground, strong upright posts secured to the base plate, with a horizontal header connected to the upper ends of both posts, and a pivotal door frame hung on hinges within the structural frame, and including simulated bolts or locks between the free end of the door and the adjacent post. The door frame itself includes a crush prop configured to receive a door section, metal or wood, in any width desired, preferably a width range of about 24 inches to 36 inches. The door frame structure provides breach training in breaching of the door using a tool between the edge of the door and the adjacent jamb, or between the door section insert and the crush prop frame, as well as use of battering rams against the door frame. The apparatus also provides for training in explosive breaching and shotgun breaching, as well as other techniques.

The breach training structure is heavy and of sufficient strength to allow use of battering rams against the door. Holes in the base are included so that if needed, stakes can be driven through the holes to anchor the base to the ground. In a preferred embodiment the header of the structural frame is secured to the post with slotted holes so as to make the width, and thus the door edge/jamb gap adjustable. This top width adjustment cooperates with a bottom width adjustment that uses spacer plates. Further, the slotted holes at the header attachment can be used to allow spreading of the outer frame when a breach tool pries between the door edge and the jamb post. Bolts securing the header are not fully tightened for this exercise.

In addition, the structural frame provides for attachment of wood walls to the posts at left and/or right if desired, to better simulate an actual breach situation. It can also provide for breach against an internal drop bar, as well as other features. In preferred embodiments the structural frame can be formed of steel box beams or steel channel, and it can be secured against a wall rather than attached to a base plate.

The breach training door of the invention is of sturdy construction and includes an actual hinged door frame. The door frame receives a door section (of a variety of widths) that can be replaced after a training session if needed. The apparatus of the invention is versatile in allowing for a wide variety of different types of breach training. These and other objects, advantages and features of the invention will be apparent from the following description of a preferred embodiment, considered along with the accompanying drawings.

DESCRIPTION OF PREFERRED EMBODIMENTS

Figure 1:
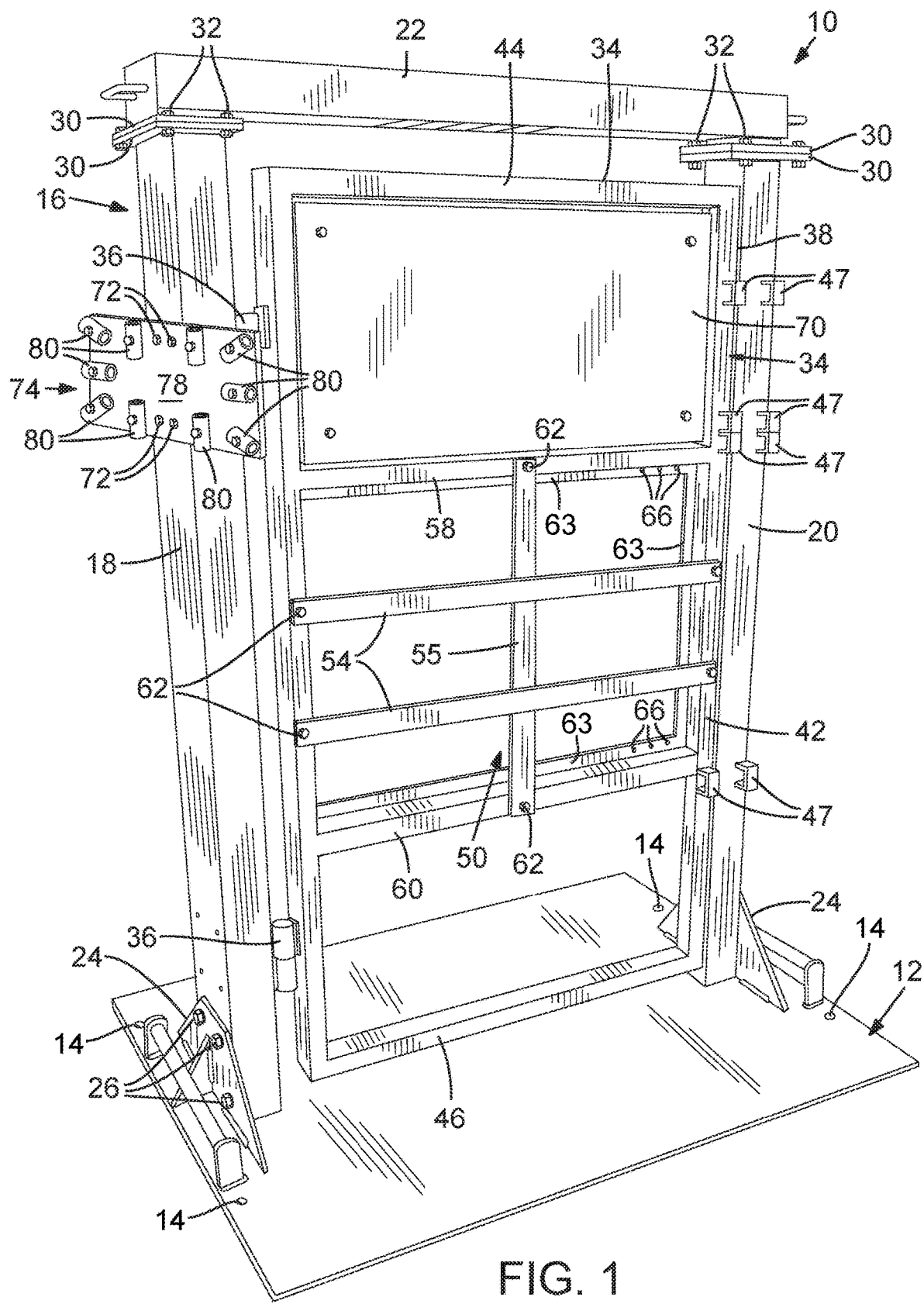
FIG. 1 is a perspective view showing a breaching training door apparatus of the invention.

FIG. 1 shows a preferred embodiment of a breach training door apparatus 10 according to the invention. The apparatus includes a preferably flat horizontal base 12, to rest on a floor or on the ground outdoors. The base can be secured to the ground if needed via holes 14 at peripheral locations on the base, through which stakes or reinforcing bars can be driven. Preferably the base plate 12 has a textured upper surface to prevent slipping by a user. This can be the non-slip metal coating sold as SlipNOT by SlipNOT Metal Safety Flooring of Detroit, Mich.

Figure 8:
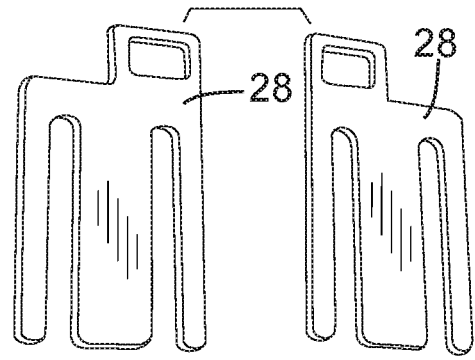
FIG. 8 is a plan view showing spacer plates for width adjustment in the apparatus.
Figure 9:
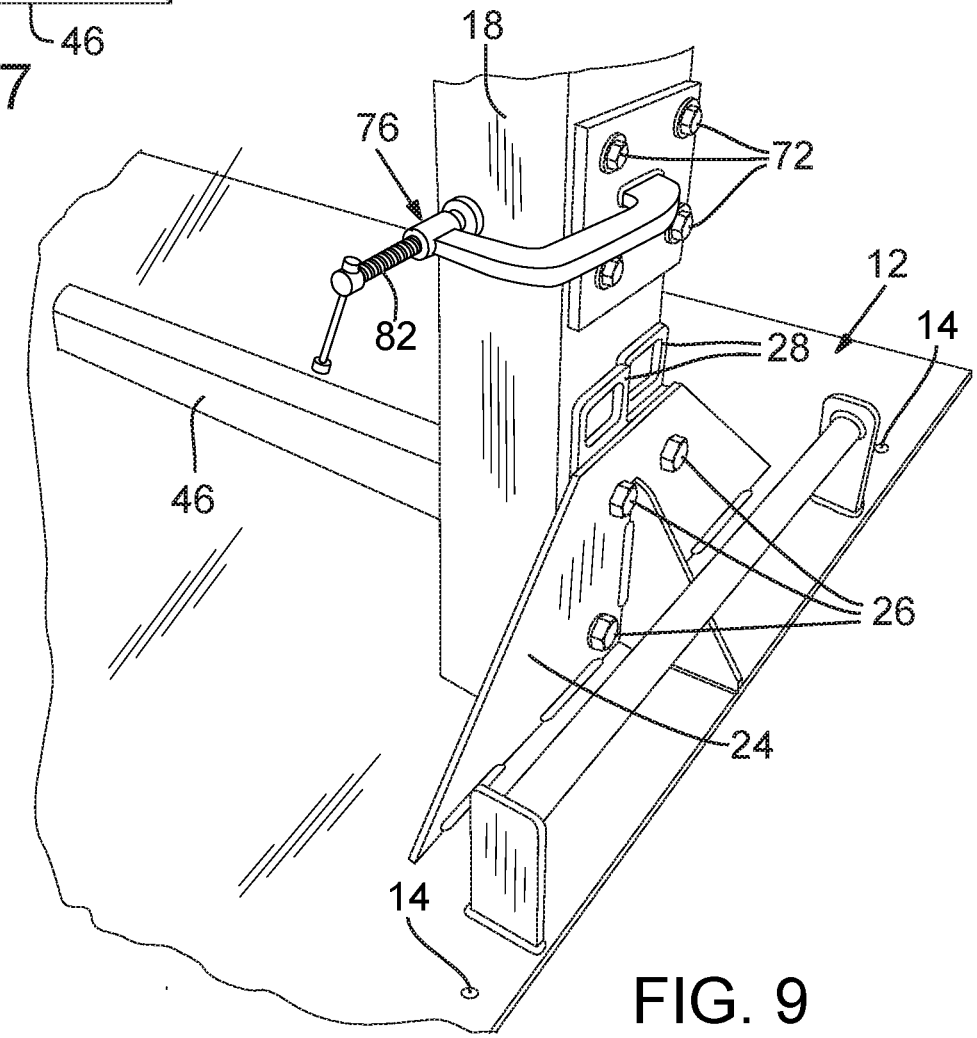
FIG. 9 is a detail view in perspective showing a feature of the invention.

To the base is connected an outer structural frame 16, including upright posts 18 and 20, in the position of door jambs at left and right, and a horizontal header 22 secured to the top ends of the two posts. These components are shown as box beams, but other structural members can be used, as explained below. As seen particularly in FIGS. 1 and 3, the connection of the posts 18 and 20 to the base 12 can be via a structural gusset plate 24, preferably welded to the base. The posts can be secured to the gusset plate by machine bolts, as illustrated at 26. See also FIG. 9. These connections can be dismantled by machine bolts, for disassembly of the apparatus 10 for transportation. Adjustment of width of the outer frame is made by adding or removing a selected number of spacer plates 28 between the gusset plate 24 and the post 18. See the detail views of FIGS. 8 (plates) and 9 (assembly). The plates are configured to be stacked when needed, with top handles staggered. A matching width adjustment at the top of the outer frame is made via slotted holes of the header/post connection(s) as discussed below.

The connection of the header bar 22 to the post can be made in any convenient and structurally sound manner. In the illustrated embodiment this is via horizontal plates 30, connected to top ends of the posts and to the lower side of the header 22, preferably by welding. These plates have holes for machine bolts 32; two or four of these can be used at each connection. For adjustability of the frame top width, the holes in either the upper plates 30 or the lower plates 30 (or both) can be slotted. As explained above, the slotted holes also provide for yielding of the frame, i.e. spreading of its top width, when a breach tool is used to pry between the door edge and the post. Resistance to yielding is adjustable via the degree of tightening of the bolts 32. Elastomeric bushings can be fitted into the slotted holes to urge the components back to normal position, as further described below.

In this breacher door trainer, an actual door 34, hung on hinges 36 from the post 18, is the object acted upon by breaching tools in many of the possible breach training operations using the invention. The breach tool can be inserted between the outer or latching end 38 of the door and the door jamb post 20, shown on the right, to pry the door open (breaking locks) or to spread the gap to release a bolt or for shotgun breaching against one or more bolts. The door comprises a rectangular door frame having two vertical frame members 40, 42 and upper and lower horizontal frame members 44, 46. In one preferred embodiment the door/frame has a width of about 38 to 40 inches and a height of about 70 inches, or a range of 60 inches to 80 inches, although it could have different width and height if desired.

The training apparatus 10 provides for breach training for either an inside-opening door or an outside-opening door. The door swings in only one direction, the jamb/post 20 having a door stop 48 at the side of the door, the edge of which is visible in FIGS. 2 and 4. This can be, for example, a ½" by 2" length of flat bar, welded to the post 18. Thus, trainees can stand on the appropriate side of the door to be trained in breaching a door that opens outwardly toward the trainee, or inwardly, away from the trainee.

Figure 3:
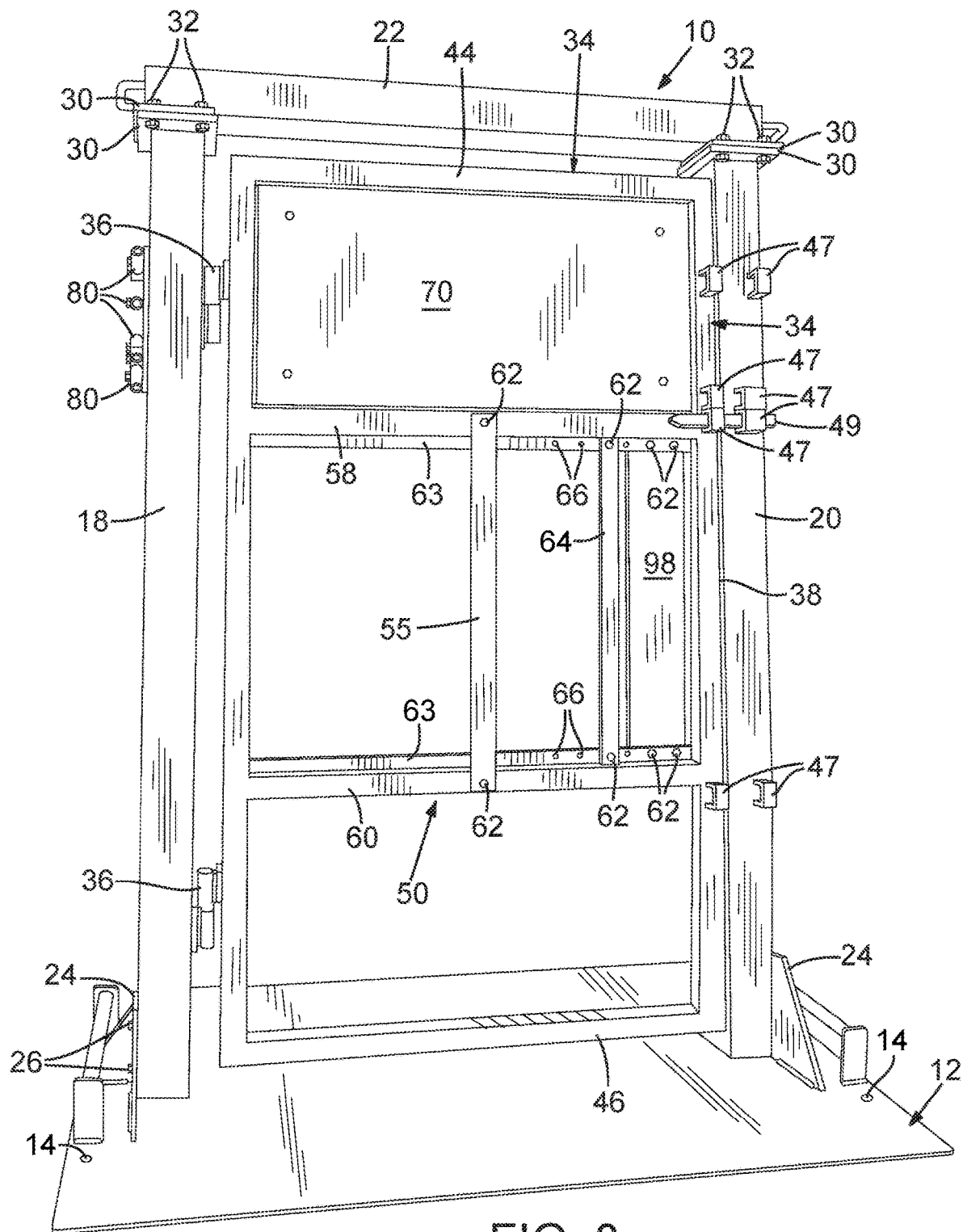
FIG. 3 is a front elevation view of the apparatus, partially in perspective.

The breaching of the door by pry bars is resisted by wood "locks". This can be, for example, survey stakes, nominally one by two inch wooden stakes with tapered ends, such as shown at 49 in FIG. 3. These are forced or driven through pairs of steel loops 47 on the breach training apparatus, each pair including one loop 47 on the outer frame post 20 and one on the door frame member 42, as best seen in FIG. 3. In a preferred form of the invention, the loops are square so as to receive two wooden stakes side by side, and these stakes can be oriented flatly to the door or with the major dimension perpendicular to the door, the latter giving a higher degree of resistance. With four different sets of these "lock" loops, as shown in the drawings, any number of the wood "locks" can be installed for various degrees of resistance to breaching. As seen in FIG. 3, two of the loop pairs are near or slightly above the middle of the door, and one high pair and one low pair are provided.

Figure 2:
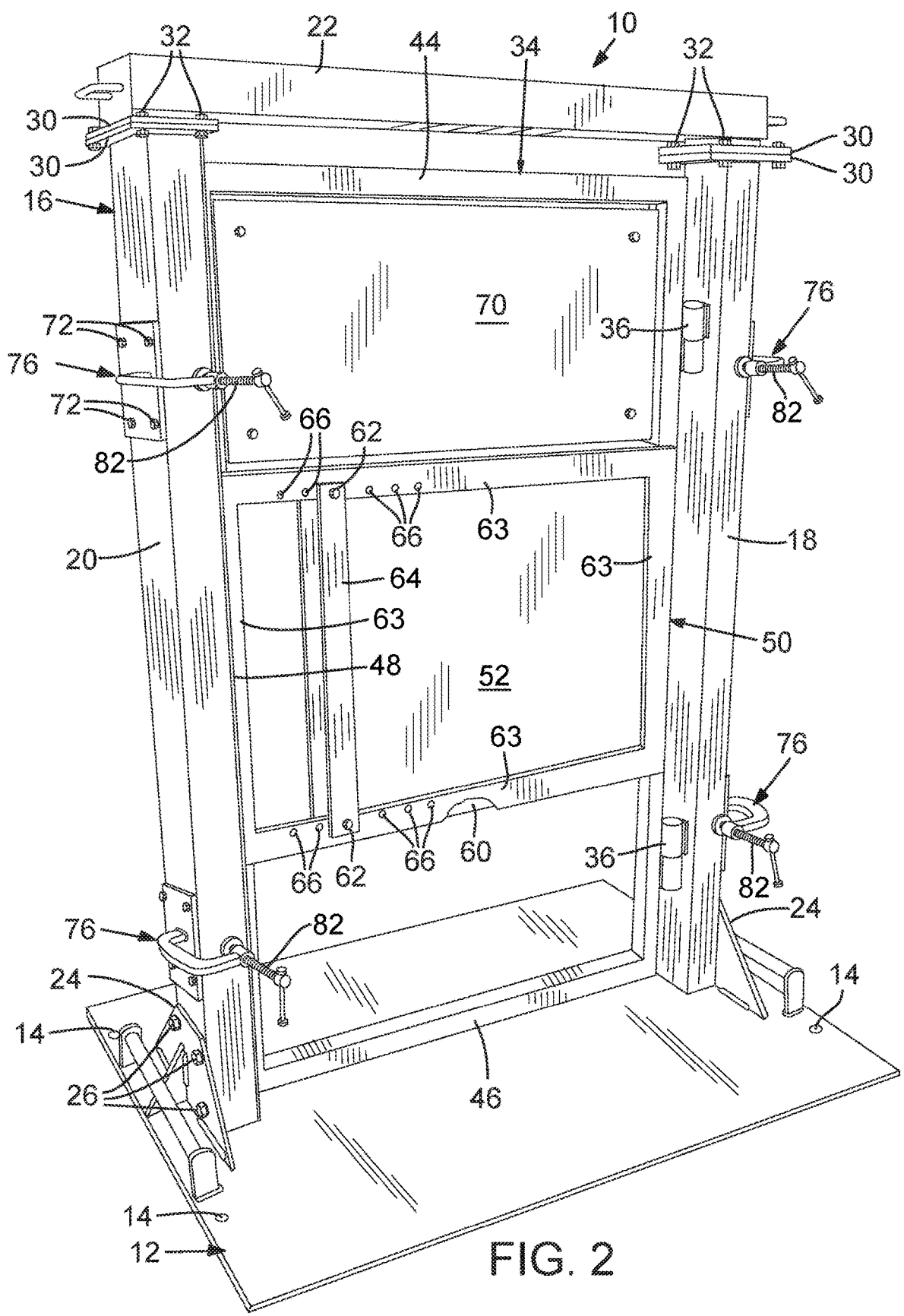
FIG. 2 is a perspective view showing the back side of the apparatus.

The hinged, swingable door 34 preferably is sufficiently tall to provide about 70 inches vertically of pryable space, between the door and the outer frame. In one embodiment the door itself is about 70 inches in height. Included within the door 24, i.e. within the door frame comprised of the members 40, 42, 44 and 46, is a crush prop 50 which is an important feature of the invention. As can be seen in the drawings, the crush prop 50 is raised above the bottom frame piece 46 and below the top frame piece 44. It may have dimensions, including the frame pieces 40 and 42, of about 38 inches wide by about 26 inches in height, spaced above the bottom frame piece 46 and below the top frame piece 44. As seen in FIG. 2, the crush prop receives a section of a door 52, and this can be of varying widths, such as 24 inches to 36 inches. Widths can be in two inch increments, such 24 inch, 26 inch, etc. The reason for accommodating this range of standard-width doors is so that the training operation can utilize scrap doors or donated doors. Most doors are 80 inches tall (or taller), and an 80 inch high door can be cut into three equal pieces of about 26 inches each, or about 26 inches as illustrated herein. The adjustable width of the crush prop 50 accommodates any of at least seven different widths, in this preferred embodiment, although more or fewer could be provided if desired. Note also that the crush prop 50 could provide for height adjustment rather than, or in addition to, width adjustment.

As seen in the drawings, the crush prop 50 includes a plurality of steel bands, which can be ³⁄₁₆ inch or ¼ inch flat bars 54, 55. In the preferred embodiment illustrated there are two spaced apart horizontal bars 54 and one central vertical bar 55. These are secured on what is referred to here as the outer side or outside of the door assembly, i.e. the side that opens toward the user and is shown in FIG. 1, and the door section is inserted from this side by removal of flat bars 54, 55. Although breaching operations are done from either side, and the back side (FIG. 2) can be used to simulate the exterior of an inward-opening door, that back side is referred to as the inner side, or inside, or back side herein. As seen in the drawings, including FIG. 7, the crush prop 50 is formed from the two vertical door frame members 40 and 42, with upper and lower horizontal crush prop framing pieces 58 and 60 secured to those uprights, preferably by welding. The bands or flat bars 54, 55 provide retention for the door section insert at the outer side of the door. These bands, preferably steel, can be, for example, 2 inch by ¼ (or ³⁄₁₆) inch steel, retained onto the front or outer side of the crush prop by machine bolts 62 preferably threaded into tapped holes in the vertical inner door frame members 40 and 42 and in the crush prop framing pieces 58 and 60. The frame members 40 and 42 can be two inch square ¼ inch thick tubing, or two inch by 1½ inch or other suitable dimensions if desired. The horizontal members of the door, 44, 58, 60 and 46 preferably are of the same material, although different structural members can be used.

The upright outer frame posts 18 and 20, as well as the header 22 of the outer frame, preferably are four inch by six inch tubing, ¼ inch steel, with the six inch dimension in the depth direction. Other dimensions and other cross sections can be used.

The door breach training apparatus 10 provides training from outside or inside, as noted above. The door 34 preferably swings outwardly as seen in FIG. 1, inwardly as seen in FIG. 2, and has a door stop 48 secured to the non-hinge post 20, to limit the door 38 so that it can only swing outwardly toward the viewer from the position shown in FIG. 1. The door stop can be a ½" by 2" flat bar, and its narrow edge is seen at 48 in FIGS. 2 and 4. This will recess the door edge 2" inward from the back side of the post 20.

As noted above, the door 34 preferably provides at least about 70 inches of pryable space between the swingable end of the door and the adjacent upright post 20. This is an important feature in breach training. The gap between the swingable end of the door and the post 20, is adjustable via adjustment of post separation as described above. The gap is not visible in FIGS. 2 and 4 but can be seen in FIGS. 1 and 3.

Figure 7:
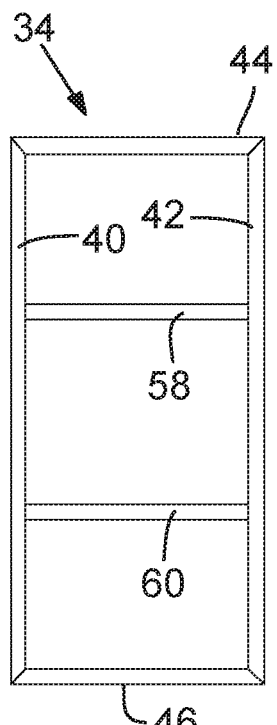
FIG. 7 is a schematic elevation view showing a crush prop of the apparatus.

As also mentioned above, in a preferred embodiment the spacing of the horizontal frame members of the door is such that the crush prop is about 26 inches or 26½ inches in height, i.e. clear space between the crush prop frame members 58 and 60. The clear space between the frame bars 58 and 44, and between the frame bars 60 and 46, can be 18 inches each location, or as desired. The internal width available for a door insert between the vertical door frame members 40 and 42 preferably is 36 inches, to accommodate a 36 inch wide door section. A schematic of the door frame 38 is seen in FIG. 7.

Figure 4:
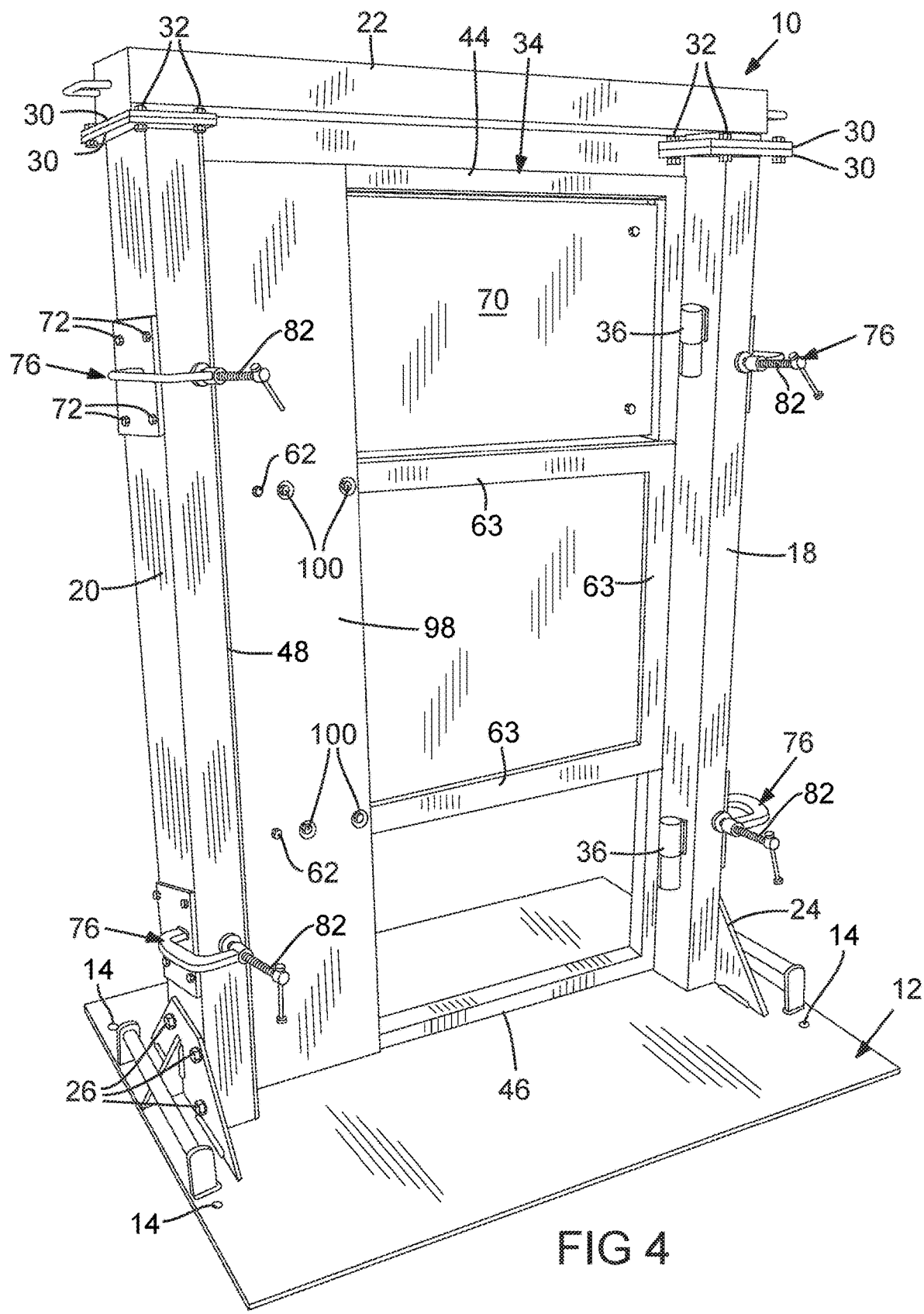
FIG. 4 is another perspective view of the back side, illustrating accessories.

At the back of the door and crush prop as shown in FIG. 2, the structural frame members of the crush prop are covered by a steel plate, preferably a steel flat bar 63 of 3/16 inch or ¼ inch thickness, welded to the four structural members 40, 42, 58 and 60. These are wider members than the structural frame members, so that a lip is provided against which the inserted door section can be engaged at the back or inside of the door. These provide an overlap of, for example, one inch at top and bottom, and ½ inch at sides (or ½ inch all around), for door section retention. Thus, if the crush prop horizontal structural frame members 58 and 60 are two inches in height, the flat bar 63 secured to those members can be three inches in width; at left and right, secured to the vertical frame pieces 40 and 42, the flat bar can be 2½ inches in width. A single frame-shaped piece can provide the four flat bars 63 as shown in FIGS. 2 and 4, or individual linear pieces can be used.

A continuous flat door edge, at the back side of the door, can be provided to engage against the door stop when closed. This can be via strips of steel or other spacers above and below the crush prop 50.

For width adjustment to accommodate a particular inserted door section width, a vertical adjustment bar 64 is provided, best seen in FIG. 2 and also in FIG. 3. For the adjustment, the upper and lower horizontal crush prop frame members 58 and 60 each have series of spaced holes 66, seen in FIG. 2. The adjustment bar, which can be, e.g., 1½ inch by ¼ inch or 2 inch by ¼ inch steel, is bolted onto the crush prop frame with through bolts, through the adjustment bar 64 and holes 66 with nuts securing the bolts. As noted above, seven different positions can be provided in a preferred embodiment, for door widths 24 inch through 36 inch. The adjustable bar 64 can be provided on both inner and outer sides of the door if desired, but at least at the back side.

As seen in most of the drawings, a flat panel 70 of steel can be included in the door frame space above the crush prop.

FIGS. 1, 2 and 3 show accessories attached to one or both sides of the upright outer frame posts 18 and 20. An array of threaded holes, e.g. a four-hole pattern, preferably is provided in the left and right sides of the frame in these posts, for attaching different accessories. Four machine bolts 72 are visible in FIGS. 1, 2 and 4, also partly visible in FIG. 3, engaged in these threaded (tapped) holes. In FIG. 1 the retained accessory is a cut tree 74. In FIG. 2 the accessory is a modified C-clamp 76, preferably attached at both left and right sides of the frame, high and low. Although shown at the back side, these C-clamps could be installed on the front side; the bolts/holes 72 are in a set pattern to allow this reversal. FIG. 3 also shows the cut tree 74. The cut tree has a backing plate 78 secured against the post with the four bolts, and includes a series of welded-on tubular retention clamps 80, e.g. ten of these in different orientations, with some extending vertically, horizontally and obliquely. They have set screws for engagement of a rod in any or all of these clamps; the rod can advantageously be a piece of reinforcing bar such as a six inch to 12 inch length of bar, ⅜ to about ⅞ inch diameter, or as desired. The cut tree is used for training for an entry through barred windows and doors, using power equipment. The cut tree can easily be removed by removal of the bolts 72.

The modified C-clamps shown in FIG. 2 and other drawings can be secured using the same bolts and threaded holes, as seen in the drawings. These clamps are for another purpose as described below. FIG. 2 shows that four of these modified C-clamps 76 can be attached. The C-clamps are oriented such that the screw threaded clamp engagement device 82 tightens toward the frame post 18 or 20. This is shown with the clamps operating at the back or inside of the outer frame. Each C-clamp has been modified to remove the tail end of the "C" that normally provides opposition for the screw threaded clamp device 82, with the remainder of the clamp welded onto the plate, as shown.

Note that the threaded holes in the four locations (two high and two low) on the left and right sides of the outer frame can also be used for attaching simulated walls, such as one or two sheets of steel or wood to simulate a breaching operation in a hallway where a wall is closely adjacent to a door. This is indicated schematically at 83 in FIG. 5, preferably an essentially full-height steel plate that can be about ¼" thick and, e.g., three feet in width.

Figure 6:
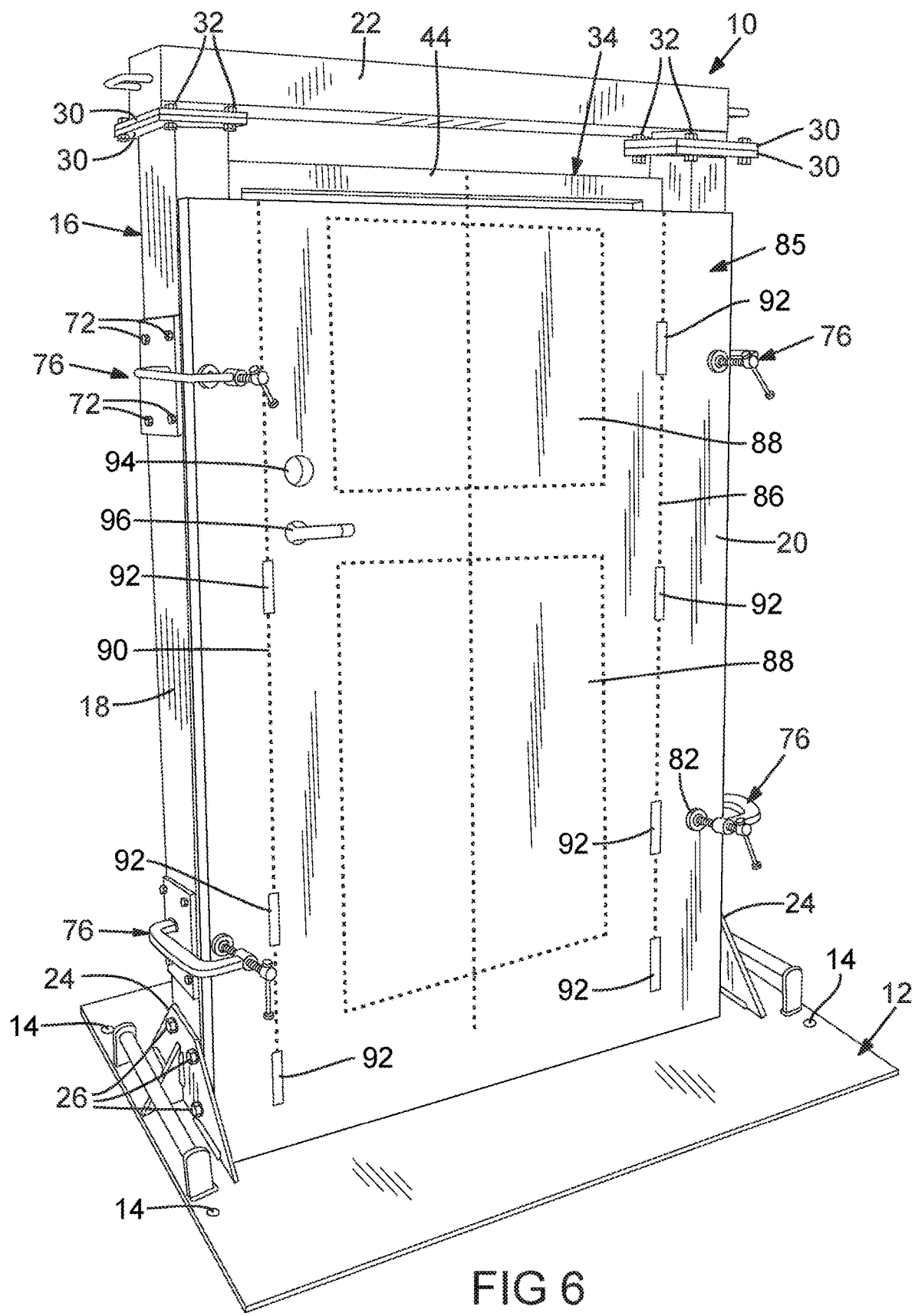
FIG. 6 is a rear elevation view showing a further feature.

One important purpose for the modified C-clamps 76 is illustrated in FIG. 6. This shows a simulated full door 85, which can be e.g. a ¾ inch particle board door or plywood door that preferably has a coating, such as melamine. The door sheet 85 is secured against the outer door frame 16 by the modified C-clamps, and this can be on either side of the frame, front or back; the C-clamps can be on either side. The breach door 34 can be removed by lifting it to release by separating the lift-out hinges 36. As indicated by dotted lines in the drawing, the door can be scored, i.e. routed to a desired depth or in some places through the door for various purposes. For example, the door could be routed or cut along the line 86 simulating entry positions. Simulated hinge locations can have shallow routing or no routing, with the remainder of the line 86 cut through or routed deeply. This can provide training for use of an explosive cutting charge to destroy the hinges of a door. Panels can be simulated at 88 in the door, and the lock side of the door can be simulated at 90, with most of that line deeply routed but with more material retained at a simulated lock locations 92. For visual impact a lock and door knob can be indicated by removed material, at 94 and 96. All this can be cut on a CNC machine.

At the lock side an explosive cutting charge could be used, as a training technique. Push charges can be placed against the panels, or anywhere on the door, to quickly blast the door away. The design of the door 85, with relief cuts as desired for the particular training exercises of fire, police or military personnel, optimizes use of each sheet with multiple breaches, such as several different cutting charge applications. For use of a door sheet simulation 85, the steel door 34 (FIGS. 1-4) is first removed (although still shown in FIG. 6). As noted above, this is quickly and easily accomplished by swinging the door outwardly (forward as seen in FIG. 1), then lifting the door frame out via the hinges 36.

FIG. 4 illustrates another aspect of the invention, with a mechanical and explosive breach plate 98 secured to the door frame 34, at the inner or back side. The breach plate can be 70 inches tall, i.e. the full height of the door 34, about 10 inches wide, and of ½ inch steel, as an example. It can have two ½ inch by 2 inch steel reinforcing ribs (not shown) welded to the side opposite that shown in FIG. 4, interrupted at the crossing crush prop members. As illustrated, the plate 98 can be attached to the frame via the holes in the horizontal flat bars 63 that are secured to the frame and discussed above for positioning the width limiting adjustment bar for the crush prop. Four bolts 100 can be used as shown, and additional machine bolts can be used at top and bottom if desired, with provision of threaded holes in the top and bottom horizontal frame bars of the door. The breach plate 98 provides for training using battering rams or explosive push charges, attempting to breach the door by forcing the door to swing outwardly, breaking the lock simulations on the outer side, i.e. the opposite side from that seen in FIG. 4. A shorter mechanical/explosive breach plate can also be provided, extending only through the height of the crush prop but still being bolted onto the frame as shown in FIG. 4.

The mechanical/explosive breach plate 98 is also seen in FIG. 3, which shows the outer side of the door apparatus but with the breach plate 98 at rear. The securing bolts 100 (with nuts) are shown extending through the holes in the ¼ inch (or 3/16 inch) flat plate 63 of the crush prop. Importantly, the heads of these bolts 100 seen in FIG. 4 are recessed into the breach plate 98. The plate can have generally cone-shaped recesses (or cylindrical recesses), so that the machine screws fit that recess shape and become flush with the surface of the plate 100. Typically these will Allen head machine screws. The flush head configuration avoids shearing off the heads when an explosive push charge is detonated against the face of the breach plate 98.

Figure 5:
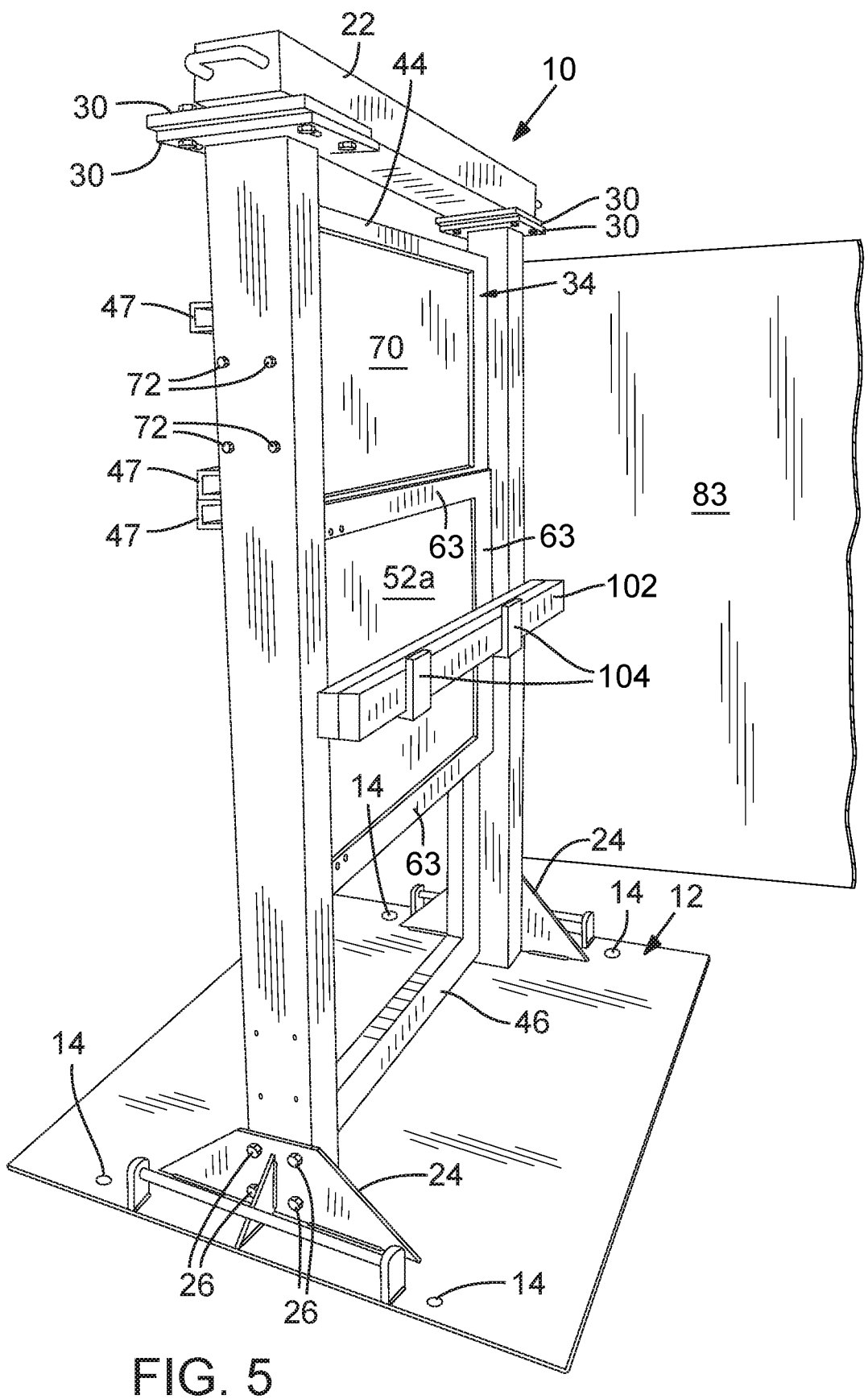
FIG. 5 is a side/rear perspective view, showing another feature.

FIG. 5 shows another aspect of the invention. At the back side (inner side) of the door apparatus a drop bar 102 can be used, providing a different kind of breach resistance especially for training in breaching a door from the outwardly-swinging side. For this purpose the crush prop receives a strong door section 52a that has heavy steel drop bar receiving U-shaped or L-shaped brackets 104 bolted or welded to the door section. As illustrated, a heavy wooden structural member, e.g. a length of 4×4 lumber (or two 2×4s), can be used as the drop bar 102. This provides very strong resistance against breach.

Another important feature of the invention is that the breach door training apparatus 10 of the invention is easily broken down into five main pieces for transportation. These are the base platform 12, the two upright posts 18 and 20, the header 22, and the door 34. The support gussets 24 remain with the base. There are smaller accessories, such as the spacer plates, the cut tree, the modified C-clamps and the mechanical/explosive breach plate as well, but the five large components are the main parts.

The breach door training device of the invention is quickly and easily set up and dismantled with standard tools, such as socket wrenches, can quickly be reconfigured to add different accessories, such as the C-clamps, cut tree, explosive breach plate and drop bar locking device, and easily dismantled and transported. The structure is without springs and is adjustable in several respects. Assembled, the device can weight approximately 1000 pounds, the weight adding to its effectiveness when used with breaching tools, battering rams or explosives. With all these features the apparatus of the invention is extremely versatile in training fire, police and military personnel in a series of different techniques for quickly breaching a door or other access point.

Figure 10:
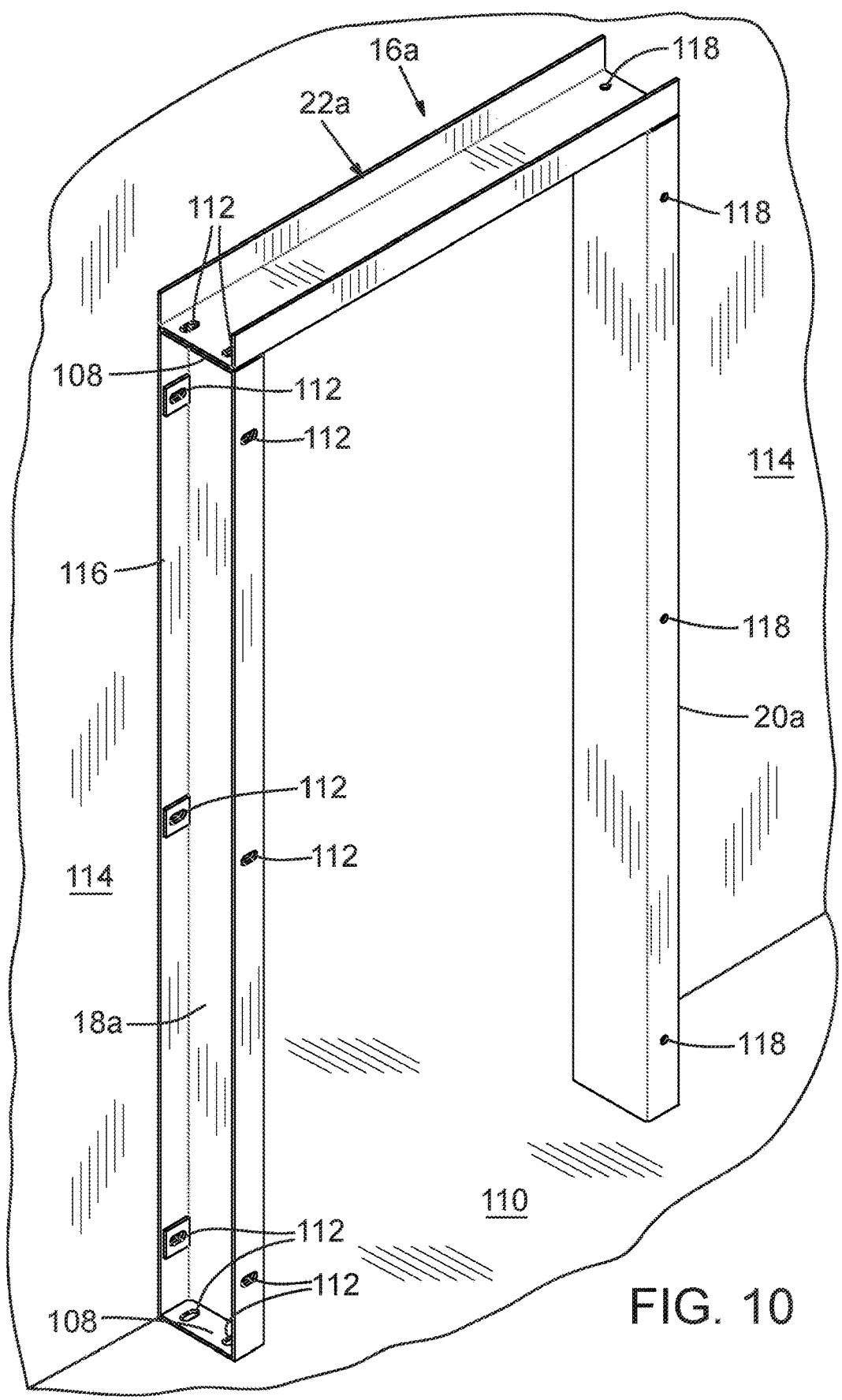
FIGS. 10-15 are perspective view and plan views showing a variation for an outer frame of the apparatus.
Figure 11:
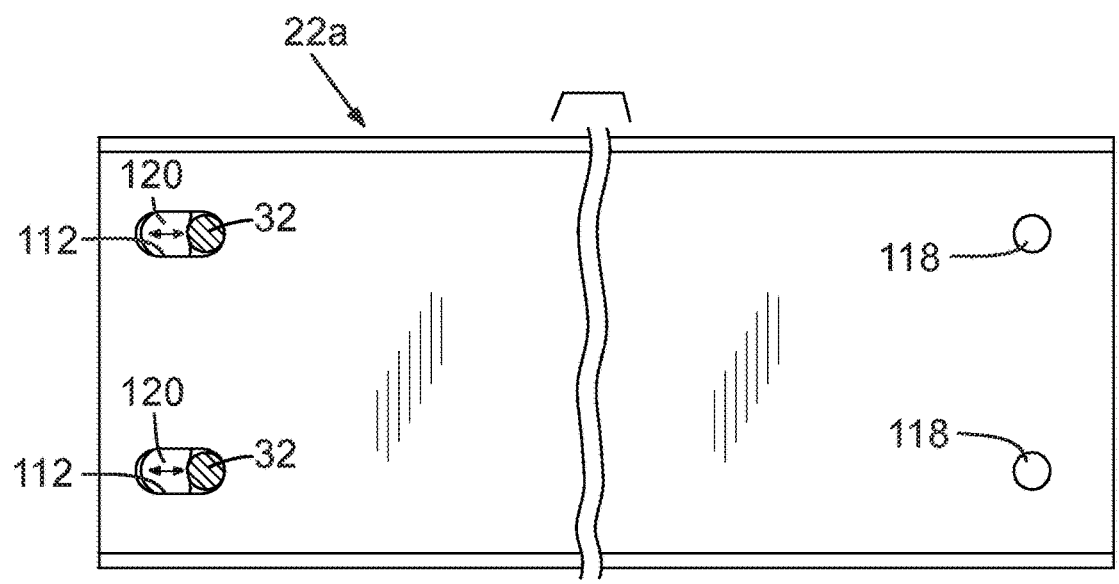
Figure 12:
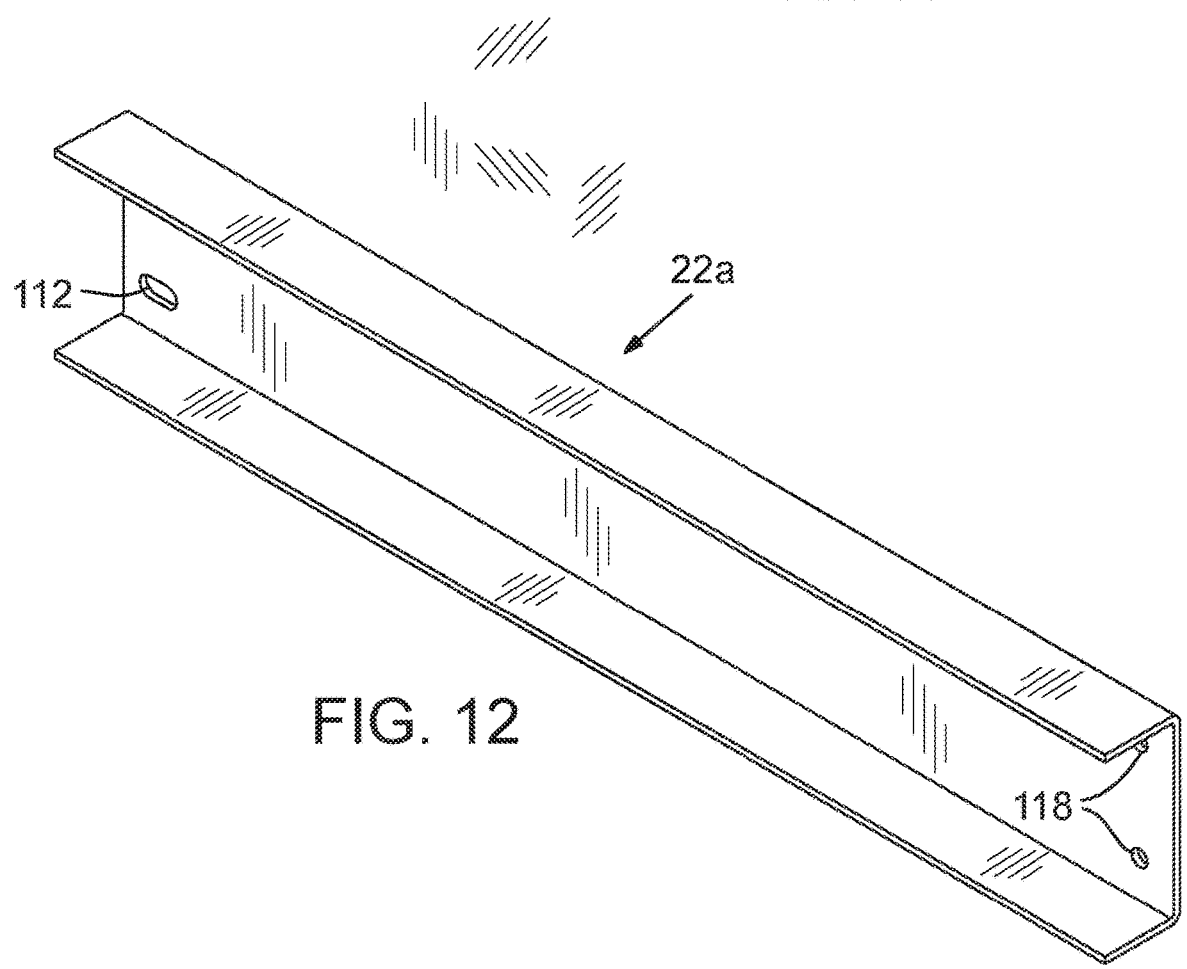

FIGS. 10 through 12 show a different form of outer structural frame 16a for the breacher door assembly, formed of structural channels, including posts 18a and 20a and a header bar 22a. The open sides of all three channels are outward, as shown in the drawing. The vertical column channels 18a and 20a have welded-in top and bottom end caps 108, which can be used for securing the posts to a floor 110, and for connection of the header bar 22a onto the tops of the two posts. Bolts through standard holes (bolts not shown in FIG. 10) secure the header bar to the post at one side of the frame, shown as the post 20a on the right in FIG. 10, while at the other post, slotted holes 112 are provided in the header bar 22a. See also FIGS. 11 and 12. These slotted holes allow for spreading apart of the two posts approximately ¾ inch or about an inch during a door breaching operation. Bolts (not shown) extend preferably up through the end cap 108 of the channel post 18a, and nuts are secured down against the web of the header bar 22a to a selected torque to provide a resistance as desired. Similarly slotted holes 112 are provided in the bottom end cap 108, for securement of the post 18a to the floor 110.

The channel outer frame 16a is an alternative to the box beam frame 16 shown in the earlier-described drawings, for application against a wall, without any base in the assembly such as the base 12 seen in FIGS. 1-6. In FIG. 10 the frame is shown secured against a wall 114. However, it should be understood that the channel frame 16a can be substituted in all respects for the box beam frame 16 in the applications shown above, and the frame 16a can be secured to a base 12 if desired. For attachment of C-clamps 76, a cut tree 74 or other accessories, or attachment to gusset plates 24 (see FIGS. 1 and 2), flat plates can be welded onto the channel flanges at outer sides as needed, with threaded holes or with non-threaded holes using nuts behind such plates.

The frame 16a can be secured to the wall 114 using bolts through slotted holes 112 in a channel flange 116 that will bear against the wall 114. As shown in FIG. 10 these slotted holes preferably are provided on both flanges of the one post, for versatility in use. At the other post, and the other end of the header bar, simple holes 118 are provided, since only one post is required to yield when a breacher bar is used against the door, the breach normally being done at the non-hinged end of the door.

In a preferred embodiment the channels are three inch by six inch (approximately six inch wide web and three inch flanges).

FIG. 11 shows, in a top plan view, the header channel 22a with normal positions of machine bolts 32 coming up from the end cap 108 of the post (FIG. 10), the bolts 32 being at the far right of the header slots 112, with the door and posts in normal position. That is, the gap between the door and post at the breaching, non-hinged end of the door, which would be on the right in FIG. 11, is at normal size. During a breaching operation using a breach tool to pry at the door edge 38, the door and the post on the left (the hinge post) will be displaced to the left and the left post will move left relative to the header bar 22. This will compress elastomeric bushings 120 seated in the slots 112. This will also occur where the post 18a is secured to the wall via slotted holes 112 (FIG. 10). Similar rubbery bushings can be fitted in the slots of the post 18a. When the breach operation is complete, the bushings 120 will tend to push the channels back toward the normal position of FIG. 10. The nuts on the bolts 32 can be loosened to aid in their return movement. This feature can also be incorporated in the outer frame 16 of FIGS. 1-9, at the connector plates 30.

The term "about" as used herein should be understood to mean plus or minus 5% of the stated dimension.

Figure 13:
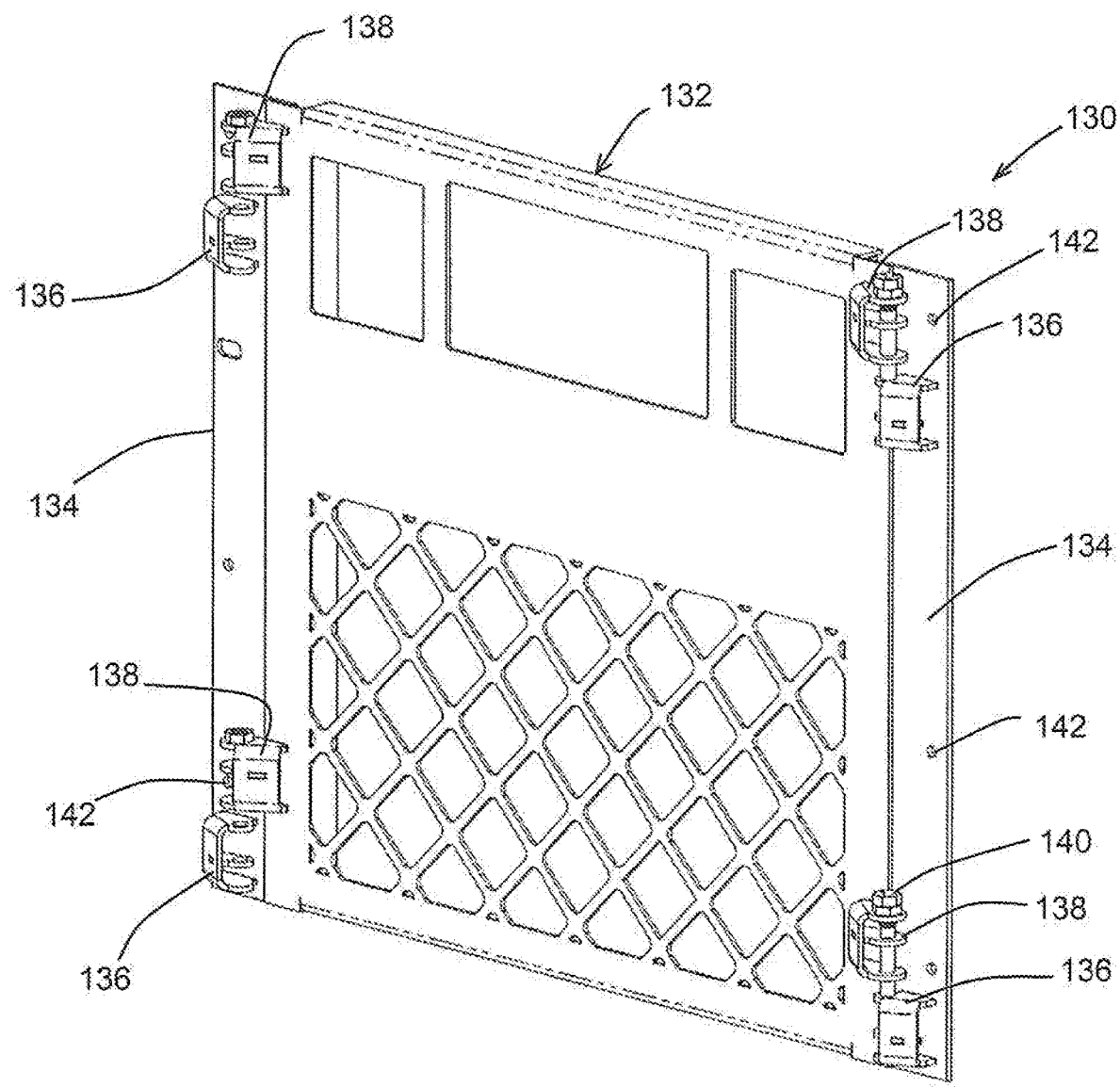

FIG. 13 shows an option that can be used with the breach door apparatus described above, particularly in FIGS. 1-9. A screen door prop assembly 130 can be secured to the two upright posts of the frame when desired. The assembly includes the screen door prop 132 itself, and flat, vertically extending steel hinge mounting plates 134 at left and right. Each of the hinge mounting plates, in a preferred embodiment, has two half-hinges 136 at upper and lower positions, and the screen door prop 132 has mating half-hinges 138 in positions to be mated to the half-hinges 136 with hinge pins 140. Four of the screen door half-hinges are shown at 138.

Figure 14:
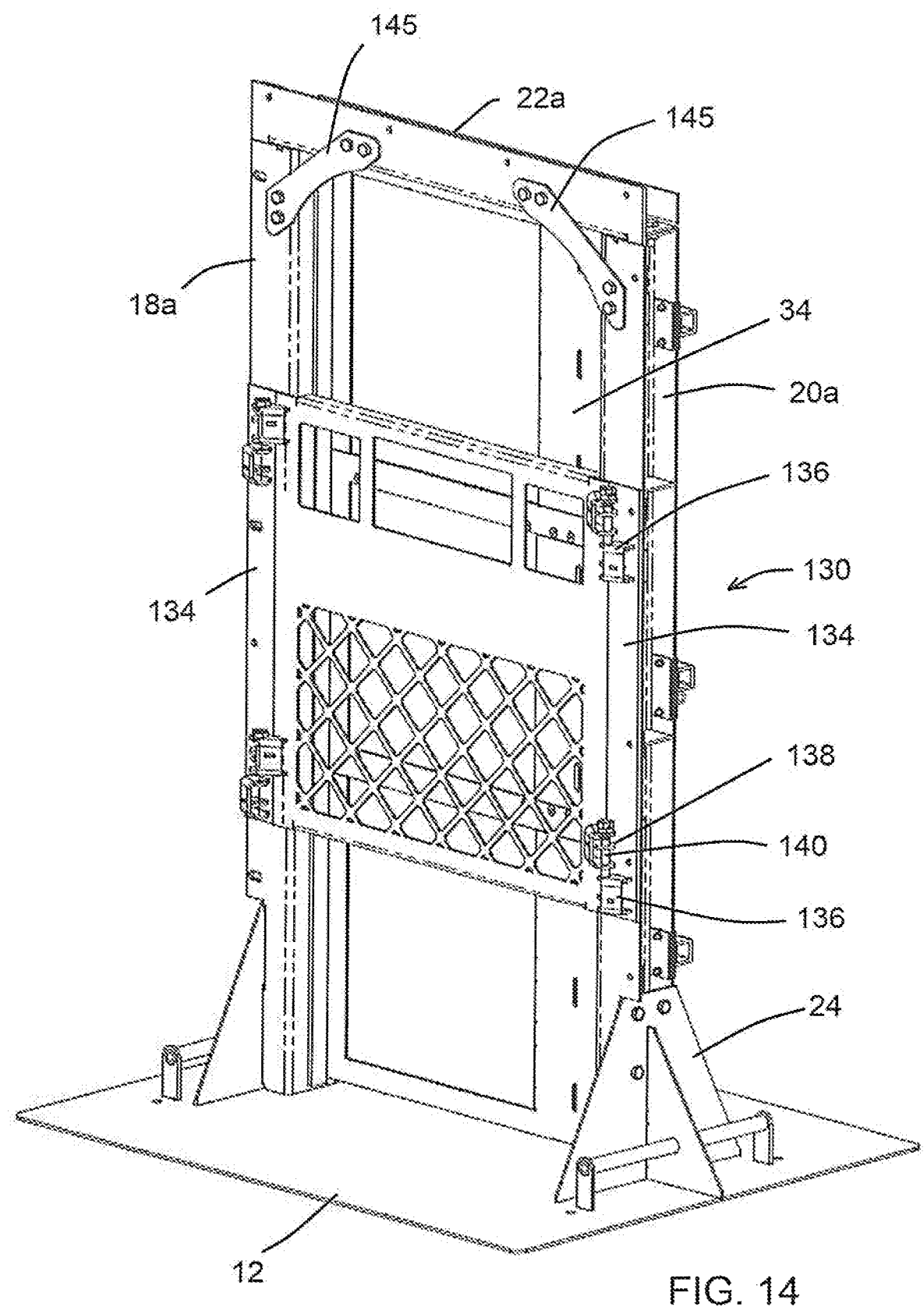
Figure 15:
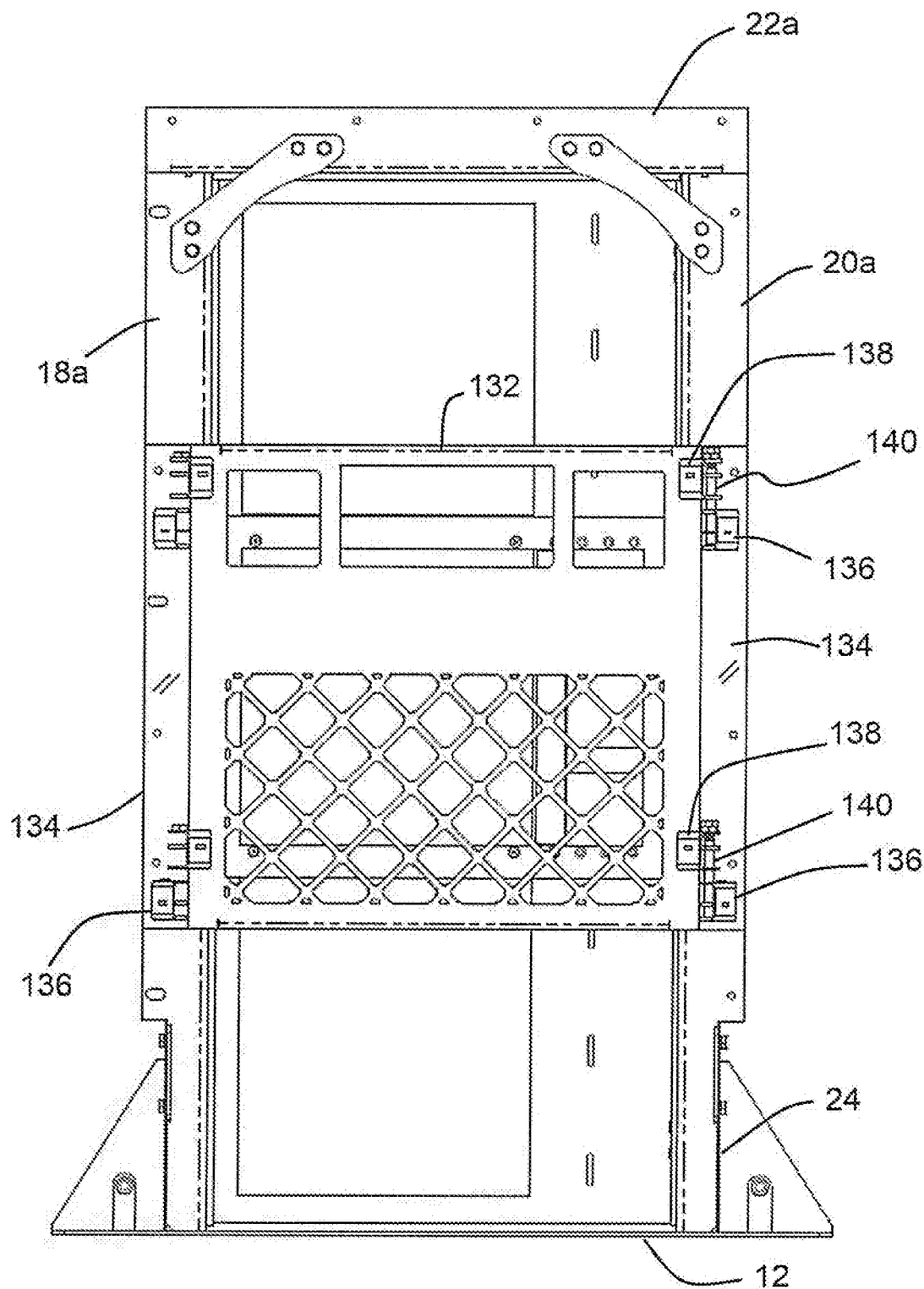

FIGS. 14 and 15 show the screen door prop assembly 130 installed on the upright posts 18a and 20a of the frame. Preferably the screen door prop is not full-height in the frame, and in this example it occupies about 40 inches of height in a 70 or 80 inch high frame. The reason for the hinge components at both sides is so that the screen door prop 132 can be swung in either direction, and thus breached from either side, at option of the trainer. In addition, when hinge pins have been installed on one side, one or two pins can be placed on the opposite side as a latching device. In preferred embodiments, some or all of the hinge pins can be breakable, such as of wood, so that only replaceable components are destroyed in a breaching operation. Alternatively, another type of latch means could be provided at one or both screen door edges, such as aligned brackets with eye holes on the door prop 132 and the plates 134, to receive pins or wood stakes, for example.

The hinge mounting plates 134 at left and right of the screen door prop have bolt holes such as at 142, for matching bolt holes in the main posts 18a and 20a. Thus, the components 134 are easily installed by use of, for example, six bolts, three at each side. These hinge mounting plates 134 can then be left in place, for optional use of the screen door prop 132 when desired. The posts 18a and 20a, in addition to the header 22a, are open channels, open sides outward, as in FIG. 10. This enables the bolt connections easily to be made.

As shown in FIGS. 14 and 15, the screen door prop 132 is formed of laser cut steel, preferably T-1 steel, approximately three times the strength of mild grade steel. At 40" height and 36" width, for example, the screen door prop is very high-strength and may weigh about 54 pounds. The screen door preferably has an open pattern as shown, the half-hinge components 138 being welded onto the steel plate of the door prop and the half-hinges 136 being welded onto the plate of the screen door. The half-hinges 138, and also the half-hinges 136, are shaped to float the hinge pins 140 out somewhat from the door prop 132 and hinge mounting plates 134, as shown particularly in FIG. 14.

In a typical breach operation the hinge pins 140 can be installed on one side, as shown in FIGS. 14 and 15. At the opposite side one or two pins can also be placed, as simulated latches for the door. The breach training operation can involve breaking open one side of the screen door (or both), and/or connecting a chain or cable hook to the screen door prop 132 via the openings, and, with the chain or cable secured to a vehicle, forcefully pulling the screen door prop off the frame via breakage of the hinge pins. The hinge mounting plates 134 remain. The screen door prop 130 is not damaged and can easily be reused, due to its strong construction. Following this screen door breach operation, the main breach door 34 can be breached as described above.

Note that FIGS. 14 and 15 show angled metal straps 145 on the frame. These rigid straps, secured by bolts to the upright posts 18a and 20a and the header 22a, hold the frame together when the bottom plate 12 is not secured. They are to be removed when the breach door apparatus is fully assembled with the bottom plate as in FIG. 14.

As in the embodiments described above, the vertical upright posts 18a and 20a are spreadable somewhat in a door breaching operation. The securement of the header 22a to the posts 18a and 20a is by slotted bolt holes, at least at one side.

The described screen door prop assembly is not limited to use on the breach door frame of the invention; with the hinge mounting plates 134, it can be attached to any doorway, or any mock-up training doorway, roughly matched to its width, to enable screen door breach training.

Although not shown in FIGS. 14 and 15, the accessories and other features shown and discussed above can be included in the embodiment just described, along with the screen door prop.

With the optional screen door prop, the breach training apparatus of the invention provides for a unique, complete and very versatile training program for fire, police, military and emergency personnel.

The above described preferred embodiments are intended to illustrate the principles of the invention, but not to limit its scope. Other embodiments and variations to these preferred embodiments will be apparent to those skilled in the art and may be made without departing from the spirit and scope of the invention.

I claim:

1. A breach training door assembly, comprising,
   a base plate to rest on a floor or ground,
   a pair of spaced apart upright posts secured to the base plate, with a horizontal header bar secured to upper ends of the upright posts to form an outer frame extending up from the base plate,
   a breach door hung in the outer frame, with hinges connecting one door edge with one of the upright posts such that the breach door can swing open and closed on the outer frame,
   at least one door lock at a second door edge opposite said one door edge, being a non-hinged side of the breach door, the door lock comprising a component breakable when the door is breached in a breach training operation,
   a separate screen door prop, generally rectangular and attachable to the outer frame at one post via hinge components for connection to the outer frame and on the screen door prop, and drop-in hinge pins to make hinge connections at said one post, and a form of latch means between the screen door prop and the other upright post, allowing breach of the screen door prop without affecting said breach door, whereby in a training operation the screen door prop can be breached with a breach tool and/or pulled off the frame when the screen door prop is tethered to a vehicle, and after the screen door prop has been breached the breaching door can be breached.

2. The breach training door assembly of claim 1, wherein the screen door prop includes a vertically extending metal hinge plate at each of left and right sides as a part of said hinge component, each of the metal plates being securable against a respective one of the upright posts so that the screen door prop extends across an opening between the upright posts, with hinge components at both left and right such that hinge pins can be placed to form the hinges at either left or right or both, so that the screen door prop can be breached from either left or right and such that at one side of the screen door prop the latch means can comprise hinges with pins, and wherein the hinge pins are breakable in a breach operation.

3. The breach training door assembly of claim 1, wherein both left and right sides of the screen door prop have hinge components which comprise half-hinges that can mate with frame-mounted hinge components comprising half-hinges when hinge pins are put in place, such that the screen door prop can be breached open with hinges at either left or right.

4. The breaching training door assembly of claim 1, wherein the outer frame is provided with a means allowing spreading of the frame such that the posts can be forced to spread apart somewhat when a breaching tool is used forcibly to breach the door open.

5. The breach training door assembly of claim 4, wherein the means allowing spreading of the frame comprises a connecting plate at the top of and secured to each of the upright posts and extending adjacent to the header bar, the connecting plate being secured to the header bar by a fastener extending into holes of the plate and the header bar, and, at least at one of the upright posts, one of the holes of the plate and header bar being slotted so as to allow movement of the post relative to the header bar, against the grip of the fastener, when sufficient spreading force is exerted by a breacher bar at the door.

6. The breach training door assembly of claim 1, wherein the screen door prop is formed of a flat plate of T-1 steel, with laser cut openings in the flat steel plate.

7. The breach training door assembly of claim 1, wherein at least the upright posts are channel members.

8. The breach training door assembly of claim 1, with at least about 70 inches of vertical pry space between the breach door and the adjacent upright post.

9. The breach training door assembly of claim 1, wherein the upright posts and the header bar are formed of channel members, the channel members having open sides facing opposite the direction in which the breach door swings open.

10. The breach training door assembly of claim 1, wherein the screen door prop is made of high-strength steel so as to be undamaged and reuseable following a breach operation.

11. For use in a breach training operation, a screen door prop assembly, comprising:
a screen door prop, generally rectangular and of high-strength steel,
half-hinges on each of left and right vertical edges of the screen door prop,
a pair of mounting plates at left and right of the screen door prop, each with half-hinges to mate with the half-hinges of the screen door prop, and
breakable pins for making hinge connections with mating half-hinges of the mounting plates and the screen door prop,
whereby the mounting plates can be secured to a doorway or to two posts, and the pins can be inserted to make hinge connections at one or both sides so that the screen door prop can be used for breach training.

12. The breach training door assembly of claim 11, wherein the screen door prop is formed of a flat plate of T-1 steel, with laser cut openings in the flat steel plate.

* * * * *